May 26, 1959  M. M. McQUEEN  2,888,030
LIQUID LEVEL RESPONSIVE VALVE
Filed May 13, 1958  3 Sheets-Sheet 1

INVENTOR
Malcolm M. McQueen
By Smyth & Roston
Attorneys

May 26, 1959    M. M. McQUEEN    2,888,030
LIQUID LEVEL RESPONSIVE VALVE
Filed May 13, 1958    3 Sheets-Sheet 2

INVENTOR:
Malcolm M. McQueen

Smyth & Roston
Attorneys

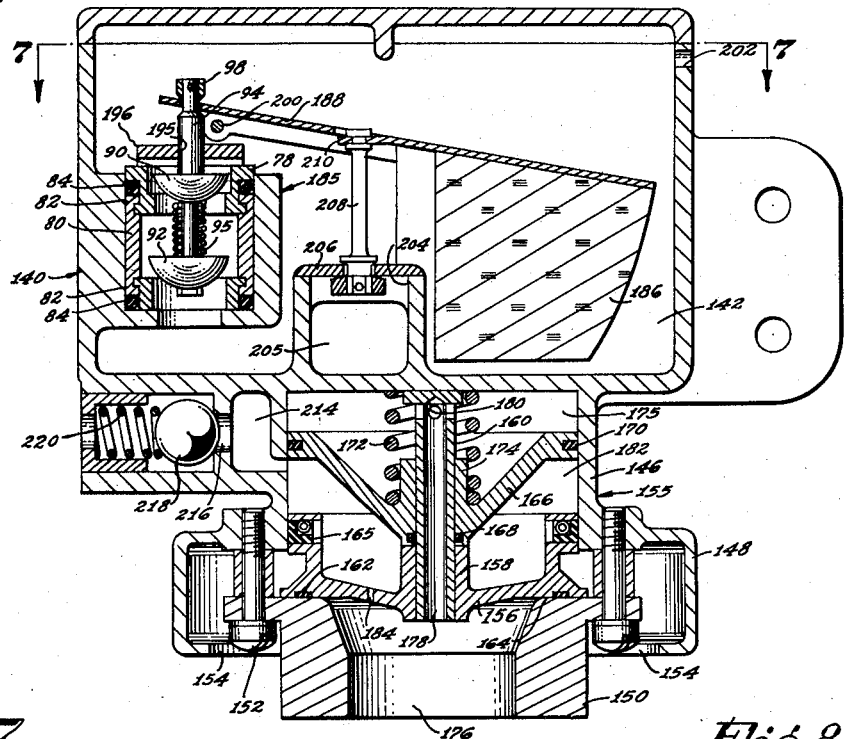
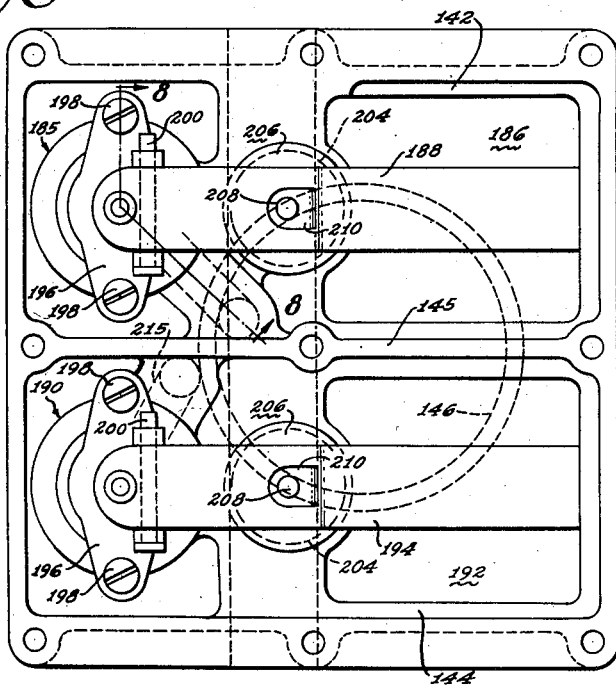
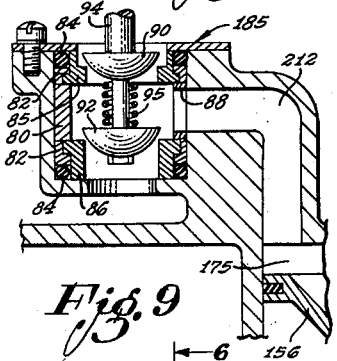
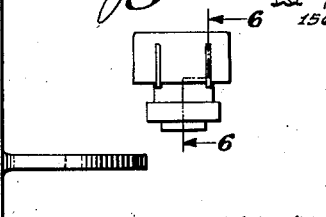

2,888,030
Patented May 26, 1959

2,888,030
LIQUID LEVEL RESPONSIVE VALVE

Malcolm M. McQueen, Hollywood, Calif., assignor to Whittaker Controls, a division of Telecomputing Corporation, Los Angeles, Calif., a corporation of California Application May 13, 1958, Serial No. 734,968

10 Claims. (Cl. 137—390)

This invention relates to a valve means for filling a tank with liquid from a pressurized supply, which valve means closes automatically in response to rise of the liquid in the tank to a predetermined level. More particularly, the invention relates to a valve assembly for this purpose of a well known type in which a float-controlled pilot valve is connected to a main valve and the main valve closes in response to back pressure created by the pilot valve.

The invention is applicable for various purposes in various fields but has special utility for controlling the filling of a fuel tank of an aircraft. Such an embodiment is described herein for the purpose of disclosure and to illustrate the principles involved for the benefit of those skilled in the art who may have other specific uses for the invention.

An aircraft that is adapted for pressure refueling during flight has a main fuel duct or manifold that leads from a pressure connection in the aircraft to a number of separate fuel tanks. A normally closed valve means for each fuel tank opens automatically in response to the fuel pressure in the main manifold to admit the fuel into the tank and closes automatically when the tank is full. Failure of the automatic valve means to close is a serious matter since fuel is supplied to aircraft at rates as high as six hundred gallons per minute and at pressures of 50 p.s.i. or higher. Malfunctioning of the valve means may result in bursting of the fuel tank, or the dumping of fuel overboard, or in the creation of dangerously high pressure surges in the fuel system.

Because malfunctioning in such a fueling operation is so hazardous, various expedients have been developed for prechecking the operativeness of the automatic valve assembly during the fueling operation to give some measure of assurance that the valve assembly will actually cut off the high pressure supply when the fuel rises to the desired level. One such expedient heretofore developed comprises remotely controlled means to raise the float arm of the pilot valve to cause the pilot valve to close temporarily during the fueling operation. If a flow meter indicates that flow into the tank stops, both the main fuel valve and the pilot fuel valve are in working order.

One disadvantage of this prior art expedient is that it necessitates complete interruption of the fueling operation. Another disadvantage is that the precheck does not cover the operativeness of the float itself which is the one part of the assembly that is most vulnerable to damage by vibration, shock and acceleration forces. A precheck which consists merely of mechanically rocking the float arm would indicate operativeness of the assembly even if the float were seriously out of order and even if the float were completely severed from the arm. A further disadvantage is the precheck operation must be initiated by a human operator who may forget to do so or may delay too long.

Another disadvantage of some precheck arrangements is the necessity for electric circuitry extending inside the fuel tank for remote control of the precheck operation. Such circuitry inside a tank adds a hazard and not only adds the cost of minimizing this hazard but also increases the cost of periodic inspection and maintenance.

The present invention avoids all of these disadvantages. It tests the operativeness of the float itself and does so without interrupting the fueling operation. The precheck is carried out automatically as soon as the fueling of the tank is initiated and therefore does not depend upon a human operator. No electric circuitry inside the tank is required. A feature of one practice of the invention is that no electrical circuitry whatsoever is used because no remote control is required.

The invention is based on the concept of utilizing the float of the the pilot valve in the normal operation of filling the tank, i.e., making flow through the main valve conditional upon proper functioning of the float itself. Thus, if fuel flow into the tank stops soon after the fueling operation starts, the float is not in working order; but if the fuel flow continues without interruption, the float can be depended upon to respond in a normal manner to rise of the liquid in the tank to the predetermined maximum level.

This concept is carried out by providing a relatively small test chamber that encloses the float and has a relatively large bottom port. An auxiliary valve for this bottom port is operatively connected to the float and closes when the float fails to respond to the rise of liquid in the test chamber. In the event that the float fails to open this bottom port of the test chamber, back pressure builds up in the test chamber to cause the main valve to close. Thus, if the float is in good working order, the small test chamber releases the fluid from the pilot valve into the fuel tank in the usual manner and the fueling operation proceeds without interruption until the tank is full. On the other hand, if the float fails to respond to the liquid in the test chamber, the fueling operation is promptly terminated by automatic closing of the main valve.

An important feature of the invention is its simplicity. Only one moving part is added to the conventional valve assembly and this part is a simple valve member which is connected to the usual float arm to control the bottom port of the test chamber.

In those instances where the fuel manifold that leads from the probe on the nose of the aircraft to the different fuel tanks is used to convey fuel from the different fuel tanks to the engine or engines, it may be desirable to add some safeguard to make sure that the main valve of an empty or partially empty fuel tank does not open in response to the pressure in the manifold. For this purpose, a safeguard may be added in the form of a remotely controlled fail-safe means to keep the tank valve normally closed. The remotely controlled means may comprise a solenoid arrangement which normally holds the pilot valve closed by spring pressure and which is energized to free the pilot valve for a fueling operation. The circuitry required for such a solenoid arrangement is completely outside the fuel tank.

The various features and advantages of the invention may be understood from the following detailed description and the accompanying drawings.

In the drawings, which are to be regarded as merely illustrative:

Fig. 6 is a sectional view along the line 6—6 of Fig. 9 illustrating a second embodiment of the invention in which the valve assembly incorporates two check valves that may function to close the main valve independently of each other;

Fig. 7 is a plan view of the second embodiment of the invention as seen along the line 7—7 of Fig. 6 with the cover of the two test chambers removed to reveal the two pilot valves and the associated float mechanism;

Fig. 8 is a fragmentary sectional view taken along the line 8—8 of Fig. 7 showing the passage for communication between the main valve and one of the two check valves; and Fig. 9 is a side elevation on a reduced scale of the second embodiment of the invention.

Figure 1:
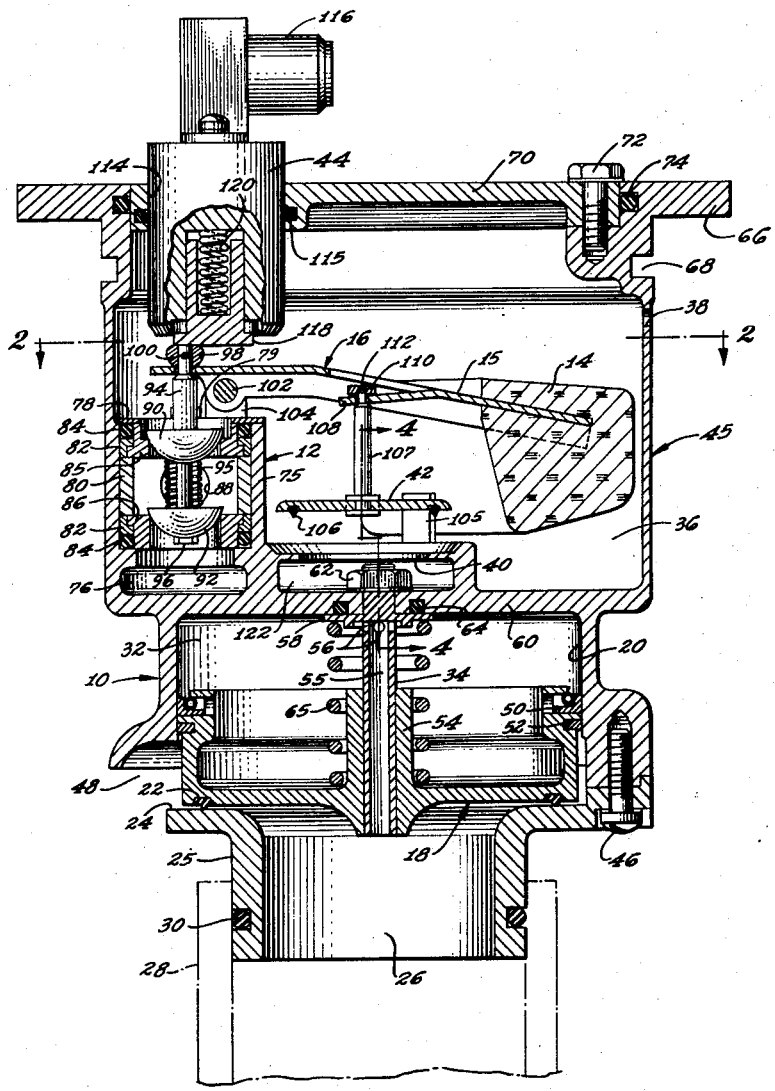
Fig. 1 is a view largely in section and partly in side elevation, the section being taken along the line 1—1 of Fig. 2 and showing the valve assembly in the normal cut-off state that prevails between fueling operations.
Figure 2:
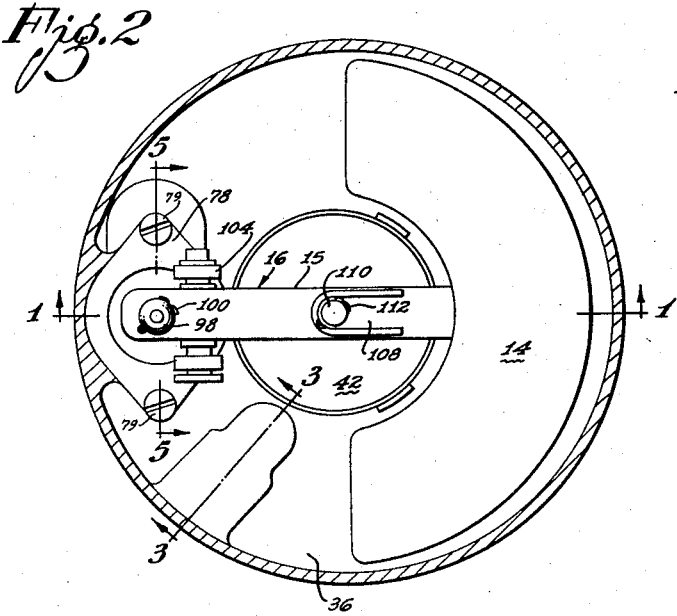
Fig. 2 is a horizontal section taken along the line 2—2 of Fig. 1 and showing the pilot valve and associated float mechanism in plan.
Figure 3:
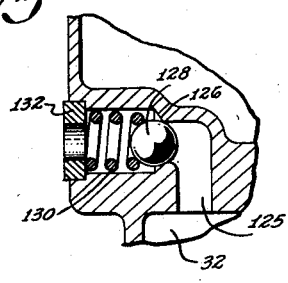
Fig. 3 is a fragmentary section taken as indicated by the line 3—3 of Fig. 2 and showing a relief valve that is incorporated in the valve assembly.

*General arrangement of the first embodiment—Figs. 1 to 5*

The principal parts of the valve assembly of the first embodiment of the invention include a main valve generally designated by the numeral 10 and a pilot valve, generally designated 12, that is controlled by a float 14 on an arm 15 of a lever, generally designated 16. The main valve 10 comprises a valve member in the form of a cup-shaped piston 18 that is mounted for reciprocation in a cylinder 20 and carries a ring 22 of rubber-like material for sealing contact with a valve seat 24. The valve seat 24 is the radial flange of a valve seat member 25 which forms an inlet port 26. The valve seat member 25 is mounted in the upper end of a nipple or standpipe 28 for communication with the pressurized fuel supply and is sealed in the standpipe by an O-ring 30.

Figure 5:
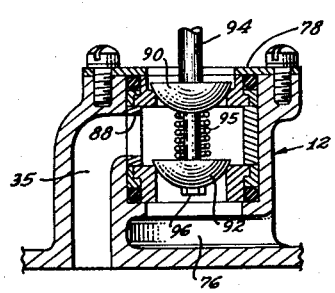
Fig. 5 is a fragmentary section taken along the line 5—5 of Fig. 2 and showing a passage for communication between the main valve and the pilot valve.

The piston 18 and the cylinder 20 in which it is mounted form what may be termed a control chamber 32 that has restricted communication with the inlet port 26 at all times by means of a guide tube 34 that extends through the piston. The control chamber 32 communicates with the pilot valve 12 by means of a passage 35 that is best shown in Fig. 5.

The pilot valve 12 discharges into a trap or float chamber 36 which may be termed a test chamber. The test chamber encloses the float 14 and is provided with two openings into the interior of the surrounding fuel tank. One opening is an upper aperture or orifice 38 of relatively small size and the other opening is a bottom port 40 that is relatively large for free fluid flow between the test chamber and the interior of the surrounding fuel tank. The bottom port 40 is controlled by an auxiliary valve comprising a valve member 42 that is operatively connected to the float arm 15 to rise and fall with the float 14.

Fig. 1 shows a solenoid generally designated 44 which is normally de-energized between refueling operations and normally holds the pilot valve 12 closed with the float 14 elevated. The solenoid 44 serves to keep the pilot valve closed and thereby serves to keep the main valve closed between fueling operations. Where a number of fuel tanks are connected to a manifold that is used for pumping fuel to the engines of the aircraft during flight, the provision of a solenoid 44 for each tank keeps fuel from being pumped into an empty or partially empty tank instead of being pumped into the engine. If the manifold is not used in this manner for pumping fuel during flight, such a solenoid is unnecessary.

To carry out a fueling operation, the solenoid 44 is energized to release the pilot valve 12 and the float 14 and fuel under pressure is supplied through the standpipe 28 to the inlet port 26 of the main valve 10. Since the fuel tank is initially empty or nearly so, the float 14 is in its lower limit position with the pilot valve 12 open. Under these conditions, fuel from the inlet port 26 flows through the guide tube 34 into the control chamber 32 but pressure does not build up in the control chamber because there is even greater freedom for the fuel to flow from the control chamber through the pilot valve into the test chamber 36. Since the float is in its lowermost position, the auxiliary valve member 42 closes the bottom port 40 of the test chamber to trap therein the fuel that is discharged by the pilot valve.

The consequent rise in liquid level in the test chamber 36 lifts the float 14 and thereby progressively lifts the auxiliary valve member 42 and simultaneously progressively moves the pilot valve 12 towards its closed position. The float 14 seeks an equilibrium position at which the auxiliary valve member 42 is elevated sufficiently to permit the fuel to be discharged through the bottom port 40 as fast as the fuel is discharged into the test chamber by the pilot valve.

If, because of some failure, the float 14 fails to rise in response to the accumulation of liquid fuel in the test chamber 36, the auxiliary valve member 42 remains in its closed position and the accumulated fuel rises until it fills the test chamber and flows out the small upper aperture 38. The aperture 38 is not large enough, however, to release the fluid from the test chamber at the same rate as the fuel enters the test chamber through the fully open pilot valve 12. Consequently, as soon as the accumulated liquid fuel rises to the level for discharge through the aperture 38, back pressure in the test chamber promptly rises and corresponding back pressure develops in the control chamber 32. The rise in pressure in the control chamber 32 forces the piston 18 downward to its closed position and the piston remains in its closed position because the area of the piston in the control chamber 32 that is under pressure from the supply source is greater than the area of the underface of the piston that is exposed at the inlet port 26. Whether or not the valve assembly closes prematurely in this manner may be ascertained by observing a flow meter in the line from the fuel source.

*Structural details of the first embodiment of the invention*

As best shown in Fig. 1, the structure of the valve assembly includes a housing casting, generally designated 45, the upper portion of which forms the test chamber 36 and the lower portion of which forms the cylinder 20 in which the piston 18 operates. The valve seat member 25 is connected with the cylinder 20 by suitable screws 46 and forms therewith a radial discharge port 48 through which the main stream of incoming fuel flows into the fuel tank.

The cup-shaped piston 18 which is provided with suitable piston rings 50 and 52, has a central collar portion 54 that slidingly embraces the downwardly extending guide tube 34. The guide tube 34 has an axial bore 55 and radial bores 56 to provide the desired restricted communication between the control chamber 32 and the inlet port 26. The base portion of the axial tube 55 is formed with a radial flange 58 and extends through the upper wall 60 of the control chamber 32. The guide tube 34 is secured by a nut 62 on its upper end and is sealed by a suitable O-ring 64 in abutment against the radial flange 58. A suitable coil spring 65 surrounding the collar portion 54 of the piston acts in compression to urge the piston towards its lower closed position.

The upper end of the housing casting 45 is formed with a radial mounting flange 66 and is formed with a circumferential groove 68 to receive an O-ring in a well known manner. The test chamber 36 is provided with a closure plate 70 for access, the closure plate being releasably secured by cap screws 72 and being sealed by an O-ring 74.

Pilot valve 12 has a cylindrical body 75 that is formed by the housing casting 45, the upper end of the valve body opening into the interior of the test chamber 36 and the lower end opening into a recess 76 at the bottom of the test chamber. A retainer member 78 that is anchored by screws 79 secures a suitable sleeve assembly in the cylindrical body 75 of the pilot valve. This sleeve assembly comprises a central sleeve member 80, two adjoining rings 82 and two O-rings 84 and provides a pair of spaced inner circumferential grooves for mounting a corresponding pair of valve seats 85 and 86. The previously mentioned passage 35 from the control chamber 32 leads to an inlet port 88 in the sleeve member 80 between the two valve seats.

A pair of rounded valve members 90 and 92 for co-operation with the two valve seats 85 and 86 respectively are mounted on a valve stem 94, the valve member 92 being slidingly mounted on the valve stem and being urged downward by a coiled spring 95 towards an enlargement 96 on the lower end of the valve stem. The enlargement 96 may be the head of a retaining screw. The upper end of the valve stem 94 is reduced in diameter and extends through an aperture in the float lever 16, the operative engagement with the float lever being completed by a collar 98 that is secured to the valve stem by a cotter pin 100.

The float lever 16 which has the cross-sectional configuration of an inverted channel is fulcrumed by a pivot pin 102 on a bracket 104 that is integral with the pilot valve body 75. The float 14 which is carried by the longer arm 15 of the lever 16 may be made of cork or other suitable light-density material and may have the semicircular configuration shown in Fig. 2.

The auxiliary valve member 42 for closing the bottom port 40 of the test chamber may be in the form of a disk slidingly confined by guide fingers 105. The valve disk has a ring 106 of rubber-like material to form a seal and has a valve stem 107 connected to the float arm 15. For this purpose the float arm may be lanced to form a bent tongue 108 that is apertured to receive the upper end of the valve stem. The valve stem 107 is reduced at its upper end to form a neck to extend through the tongue aperture and the upper end of the valve stem is provided with a keeper collar 110 that is secured to the valve stem neck by the cotter pin 112.

If the solenoid 44 is included in the valve assembly for the purpose heretofore discussed, it may be mounted in an opening 114 in the closure plate 70 and sealed in place by a suitable O-ring 115. The solenoid is thus exposed at the exterior of the fuel tank and is provided with an exterior fitting 116 for connection to the wiring of the remote control circuit. The solenoid has an armature 118 that is normally pressed outward by an enclosed spring 120 against the valve stem 94, the spring being strong enough to force the pilot valve 12 to closed position with consequent elevation of the float 14 as shown in Fig. 1.

Figure 4:
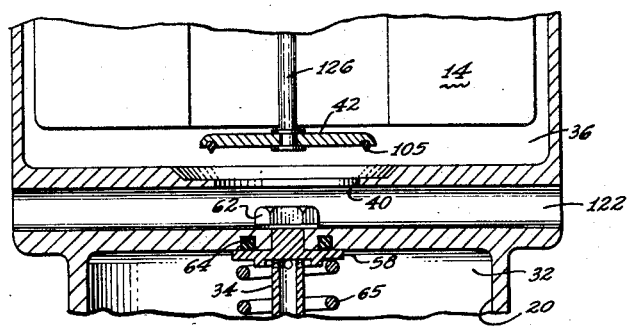
Fig. 4 is a fragmentary section taken along the line 4—4 of Fig. 1 and showing the bottom port of the test chamber open for free drainage of liquid therefrom into the fuel tank.

The bottom port 40 of the test chamber 36 opens into a transverse passage 122 which, as shown in Fig. 4, is open at both ends for free communication with the interior of the fuel tank. When the valve assembly is functioning properly with fuel flowing into the chamber, the portion of the fuel diverted through the pilot valve 12 holds the float 14 sufficiently elevated to permit the fuel to flow into the tank through the bottom port 40 and the transverse passage 122.

When the fuel level in the tank reaches the transverse passage 122, however, the fuel backs up through the transverse passage and the port 40 into the test chamber 36, the upper aperture 38 (Fig. 1) of the test tank serving as a vent to permit the liquid to rise freely in the test chamber. When the liquid level rises to the predetermined height, the float 14 rises to close the pilot valve 12 and thus causes the main valve 10 to close in opposition to the pressure from the fuel supply.

If the valve assembly is not functioning properly, however, failure of the float 14 to rise in response to discharge of fuel into the test chamber 38 by the pilot valve 12 results in the auxiliary valve member 42 remaining in closed position. The test chamber then promptly fills with liquid to cause the main valve 10 to close as heretofore explained.

Preferably the valve assembly includes a relief valve to prevent the occurrence of excessive pressure surges in the control chamber 32. For this purpose, a relief passage from the interior of the control chamber 32 to the interior of the tank may be provided as indicated at 125 in Fig. 3. The relief passage 125 is formed with a valve seat 126 for cooperation with a valve ball 128. A coil spring 130 held under compression by a bushing 132 normally holds the ball on the seat. The spring yields to excessive rise of pressure to permit flow from the control chamber 32 directly into the fuel tank.

*The second embodiment of the invention—Figs. 6 to 8*

The second embodiment of the invention differs from the first embodiment essentially in the provision of two pilot valves and two corresponding test chambers to control the main valve independently of each other. The provision of two pilot valves provides further assurance that the main valve will close when the fuel tank is full. Reliability is increased because both of the pilot valves and their associated floats must be in good working order to permit a fueling operation to be carried out at all.

The structure of the valve assembly in the second embodiment of the invention includes a housing casting generally designated 140 which forms two upper test chambers 142 and 144 separated by a partition 145 and which further forms a downwardly extending cylinder 146 for the main valve. The downwardly extending cylinder 146 has an enlarged skirt 148 which is connected to a valve seat member 150 by suitable screws 152. The skirt 148 forms with the valve seat member 150 an annular outlet port 154 of a main valve, the main valve being generally designated by numeral 155.

The valve member for the main valve 155 comprises a piston 156 having a collar portion 158 that slidingly embraces an axial guide tube 160. The piston 156 is provided with the usual valve ring 162 of rubber-like material for contact with the valve seat 164 and is also provided with a suitable peripheral ring 165 for sealing contact with the cylinder 155.

Slidingly mounted on the axial guide tube 160 above the piston 156 is a second piston 166 that has an inner O-ring 168 for sealing contact with the guide tube and has an outer O-ring 170 for sealing contact with the surrounding cylinder 146. A suitable coil spring 172 seats around a collar portion 174 of the piston 166 to urge the piston downwardly. This upper piston 166 forms with the cylinder 146 a first control chamber 175 for the main valve, which chamber is in constant communication with the inlet port 176 of the main valve by means of an axial bore 178 in the guide tube, together with upper radial bores 180. The two pistons 156 and 166 together with the cylinder 146 form a second control chamber 182 for the main valve and this second control chamber is in continuous communication with the inlet port 176 by virtue of an aperture 184 in the lower piston 166.

The test chamber 142 houses a pilot valve, generally designated 185, controlled by a float 186 on a float lever 188 and the second test chamber 142 encloses a second pilot valve generally designated 190 controlled by a float 192 on a float lever 194. Each of the pilot valves 185 and 190 is of the construction heretofore described, as indicated by the use of corresponding numerals to indicate corresponding parts. The valve stem 94 of each pilot valve extends through a guide bore 195 in a guide bracket 196 that is anchored to the valve at its two ends by suitable screws 198 (Fig. 7). Each of the float levers 188 and 194 is of the same general construction as heretofore described, being fulcrumed on a crosspin 200 and being connected to the valve stem of the corresponding pilot valve in the previously described manner.

As heretofore described, each of the test chambers 142 and 144 is of sealed construction except for the usual upper restricted aperture 202 and the usual bottom port 204. The two bottom ports 204 open into a transverse passage 205, the opposite ends of which open into the interior of the fuel tank. Each of the bottom ports 204 is controlled in the manner heretofore described by a valve member 206 on the lower end of a valve stem 208 with the upper end of the valve stem operatively connected to a tongue 210 of the corresponding float lever 188.

The inlet port 88 of the pilot valve 185 is connected with the first upper control chamber 175 by means of a passage that is indicated by numeral 212 in Fig. 8. The second control chamber 182 is in communication with a recess 214 shown in Fig. 6, and the recess 214 is in communication with the second pilot valve 190 by a passage that is shown in dotted lines at 215 in Fig. 7. A relief passage 216 extends to the exterior of the valve assembly and is controlled in the usual manner by a valve ball 218 under the compression of a coil spring 220.

It is apparent that this second embodiment of the invention functions in the same manner as the first embodiment. If the two pilot valves and their floats are in good working order, the floats will rise sufficiently in response to the fuel from the pilot valves to permit the fuel to drain freely from the two test chambers through the two bottom ports 204. Thus, the two pilot valves and their floats are tested automatically without interrupting the fueling operation. If either of the two floats fails to respond to the discharge of the fuel into its test chamber, the test chamber fills with the liquid fuel and then creates sufficient back pressure on the corresponding control chamber 175 or 182 to cause the main valve to close.

If the rise in back pressure occurs in the upper control chamber 175, the upper piston 156 is forced downward and in turn forces the lower piston 166 downward to its closed position. If the rise in back pressure occurs in the lower control chamber 182, the pressure therein directly forces the lower piston 166 to its closed position. Back pressure of sufficient magnitude to close the main valve cannot occur in either of the two control chambers 175 and 182 if the corresponding pilot valve is open because the flow from the inlet port 176 into the control chamber is much more restricted than the path of flow through the corresponding pilot when the pilot valve is open.

My description in specific detail of the two selected embodiments of the invention will suggest various changes, substitutions and other departures from my disclosure within the spirit and scope of the appended claims.

I claim:

1. In a valve assembly for controlling the flow of liquid from a pressurized supply into a tank, wherein a main valve is closed by back pressure created by a pilot valve and a float operates through a given range of levels to close the pilot valve in response to rise of the liquid level in the tank, the improvement comprising: means enclosing said float and confining the discharge from said pilot valve to accumulate a body of liquid for lifting action on the float; means providing restricted communication between said confining means and the interior of the tank to release the confined liquid at a retarded rate thereby to build up back pressure in the confining means to close said main valve; and normally closed means to open to provide more liberal communication between the confining means and the interior of the tank to prevent creation of effective back pressure in the confining means and to permit the liquid level in the tank to extend into the confining means to lift said float through said given range, said normally closed means being operatively connected to said float to open in response to upward movement of the float through only an initial portion of said given range whereby the operation of the float is tested automatically in the course of filling the tank without closing the pilot valve and failure of the float to respond to the test causes the main valve to close automatically.

2. The improvement as set forth in claim 1, which includes remotely controlled means normally effective to maintain said pilot valve closed regardless of the liquid level when the main valve is not connected to a pressurized supply, said remotely controlled means being operable to release the pilot valve for opening.

3. In a valve assembly for controlling the flow of liquid from a pressurized supply into a tank, wherein a main valve is controlled by back pressure from a pilot valve having a float for progressive closing action in response to the rise of the liquid level in the tank, the improvement comprising: a chamber connected to said pilot valve to receive the discharge therefrom and enclosing said float to trap liquid from said pilot valve, said chamber having a first port to permit the liquid level in the tank to extend into the chamber and to permit drainage from the chamber into the tank when the liquid level in the tank is below the chamber to prevent sufficient accumulation of liquid in the chamber from the pilot valve to operate the float, said chamber having a second relief port sufficiently small to cause back pressure to build up therein to close said main valve when the pilot valve is open and said first port is closed; and an auxiliary valve to close said first port of the chamber, said auxiliary valve being operatively connected with said float for progressive opening action in response to rise of the float whereby when liquid is flowing through said main valve and pilot valve and the liquid level in the tank is below said first port, the float seeks an equilibrium position with both the pilot valve and the auxiliary valve open for liquid flow into and out of the chamber at equal rates.

4. The improvement as set forth in claim 3, in which said second port is substantially higher than said first port to serve as a vent to permit the liquid level in the tank to rise through said first port into said chamber.

5. The improvement as set forth in claim 3, which includes remotely controlled means normally effective to maintain said pilot valve closed regardless of the liquid level when the main valve is not connected to a pressurized supply, said remotely controlled means being operable to release the pilot valve for opening.

6. The improvement as set forth in claim 5, in which said remotely controlled means comprises spring means to hold the pilot valve closed and an electromagnetic means to overcome said spring means thereby to release the pilot valve.

7. The improvement as set forth in claim 3, which includes a lever having an intermediate fulcrum, said float and auxiliary valve being connected to said lever on one side of its fulcrum, said pilot valve being connected to the lever on the other side of its fulcrum.

8. The improvement as set forth in claim 3, which includes a remotely controlled solenoid, said solenoid being spring-loaded to hold said pilot valve closed when the solenoid is de-energized.

9. In a valve assembly for controlling the flow of liquid from a pressurized supply into a tank, wherein a main valve has two control chambers connected with two corresponding pilot valves to cause the main valve to close by back pressure whenever either of the two pilot valves closes, said pilot valves being operated by corresponding floats, the improvement which comprises: two upper chambers connected to said two pilot valves respectively to receive the discharge therefrom and enclosing said two floats respectively to accumulate liquid from the pilot valves to operate the floats, each of said chambers having a first relatively low port to permit the liquid level in the tank to extend into the chamber and to permit drainage from the chamber into the tank when the liquid level in the tank is below the chamber to prevent sufficient accumulation of liquid in the chamber from the pilot valve to operate the float, each of said chambers having a second higher port sufficiently small to cause back pressure to build up therein to close said main valve when the corresponding pilot valve is open and the corresponding first port is closed; and an auxiliary valve in each of said chambers to close said first port thereof, said auxiliary valve being operatively connected with the corresponding float for progressive opening action in response to rise of the float whereby when liquid is flowing through said main valve and pilot valve and the liquid level in the tank is below said first port, the float seeks an equilibrium position with both the pilot valve and the auxiliary valve open for liquid flow into and out of the chamber at equal rates.

10. In a valve assembly for controlling the flow of liquid from a pressurized supply into a tank, wherein a main valve is controlled by back pressure created by a pilot valve having a float for progressive closing action in response to the rise of the liquid level in the tank, the improvement comprising: means enclosing said float to confine the discharge from the pilot valve to form a body of liquid for lifting action on the float; means providing restricted communication between said enclosing means and the tank to release the confined liquid into the tank at a retarded rate thereby to build up back pressure in the enclosing means to cause said main valve to close; and means responsive to the rise of said float to open said confining means to the interior of said tank to prevent the build-up of back pressure in the confining means and to permit the liquid level in the tank to extend into the confining means for lifting action on the float.

References Cited in the file of this patent

UNITED STATES PATENTS

| | | |
|---|---|---|
| 757,903 | Ford | Apr. 19, 1904 |
| 1,376,214 | Mead | Apr. 26, 1921 |
| 2,750,954 | Russell | June 19, 1956 |
| 2,780,234 | Russell | Feb. 5, 1957 |